United States Patent
Feng et al.

(10) Patent No.: US 9,847,707 B2
(45) Date of Patent: Dec. 19, 2017

(54) CONVERTER

(71) Applicant: DELTA ELECTRONICS, INC., Taoyuan (TW)

(72) Inventors: Wei-Yi Feng, Taoyuan (TW); Li-Zhi Xu, Taoyuan (TW); Wei-Qiang Zhang, Taoyuan (TW); Hong-Yang Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/212,280

(22) Filed: Jul. 17, 2016

(65) Prior Publication Data
US 2017/0054359 A1 Feb. 23, 2017

(30) Foreign Application Priority Data
Aug. 20, 2015 (CN) .......................... 2015 1 0514914

(51) Int. Cl.
*H02M 1/32* (2007.01)
*H02M 7/487* (2007.01)
*H02M 7/538* (2007.01)
*H02M 1/34* (2007.01)

(52) U.S. Cl.
CPC .............. *H02M 1/32* (2013.01); *H02M 7/487* (2013.01); *H02M 7/538* (2013.01); *H02M 2001/348* (2013.01); *Y02B 70/1441* (2013.01)

(58) Field of Classification Search
CPC ............ H02M 1/32; H02M 1/36; H02M 1/40; H02M 1/92; H02M 7/487; H02M 7/538; H02M 2001/348; Y02B 70/126; Y02B 70/1491; H02H 7/106; H02H 7/1213; H02H 7/7575; H02H 7/1206; H02H 7/1209
USPC ..... 363/17, 24, 50, 51, 56.01–56.11, 80, 98, 363/132
See application file for complete search history.

(56) References Cited

U.S. PATENT DOCUMENTS

| | | | |
|---|---|---|---|
| 6,127,814 A * | 10/2000 | Goder | H02M 3/1588 323/282 |
| 6,169,672 B1 | 1/2001 | Kimura et al. | |
| 2005/0068795 A1* | 3/2005 | Konopka | H02M 7/53803 363/98 |
| 2013/0127500 A1* | 5/2013 | Kobayashi | H03K 17/0822 327/109 |
| 2014/0098585 A1 | 4/2014 | Ikeda | |
| 2015/0049517 A1* | 2/2015 | Yan | H02M 3/33569 363/17 |

FOREIGN PATENT DOCUMENTS

| | | |
|---|---|---|
| CN | 100337392 C | 9/2007 |
| EP | 0926926 A1 | 6/1999 |
| JP | H06165486 A | 6/1994 |
| TW | I280377 B | 5/2007 |

* cited by examiner

*Primary Examiner* — Yemane Mehari
(74) *Attorney, Agent, or Firm* — CKC & Partners Co., Ltd.

(57) ABSTRACT

A converter includes a first bridge arm and a voltage clamping unit. The first bridge arm includes a first switching unit. The voltage clamping unit is coupled to the first bridge arm, and includes a first charging branch and a second charging branch. The first charging branch is configured to have a first resonant frequency, to absorb a first spike of the first switching unit. The second charging branch is configured to have a second resonant frequency to absorb a second spike of the first switching unit.

20 Claims, 7 Drawing Sheets

CONVERTER

RELATED APPLICATIONS

This application claims priority to China Application Serial Number, 201510514914.4, filed Aug. 20, 2015, which is herein incorporated by reference.

BACKGROUND

Technical Field

The present disclosure relates to a converter. More particularly, the present disclosure relates to a converter having a voltage clamping protection.

Description of Related Art

Recently, converters have been widely applied in various fields, which include, for example, solar inverters, uninterruptible power supply (UPS), power conditioning system (PCS), etc.

The converter generally includes switching units. In the operations of the converter, the voltage spikes are generated, during the switching units are turned off, to have an impact on elements of the converter. In some approaches, a voltage clamping protection is applied to the converter, in order to prevent the switching units from being damaged by the voltage spikes.

In current approaches, the voltage clamping protection is only able to absorb the voltage spikes having a single frequency. However, with the different parasitic inductances or capacitances, the voltage spikes, generated during the switching units are turned off, may have multiple frequencies. Thus, the operations of the current voltage clamping protection cannot provide a complete protection for the switching units.

SUMMARY

An aspect of the present disclosure is to provide a converter. The converter includes a first bridge arm and a voltage clamping unit. The first bridge arm includes a first switching unit. The voltage clamping unit is coupled to the first bridge arm, and includes a first charging branch and a second charging branch. The first charging branch is configured to have a first resonant frequency, to absorb a first spike of the first switching unit. The second charging branch is configured to have a second resonant frequency to absorb a second spike of the first switching unit.

Yet another aspect of the present disclosure is to provide a voltage clamping unit. The voltage clamping unit includes a first charging branch, a second charging branch, a first discharging branch, and a second discharging branch. The first charging branch is coupled in parallel with a switching unit, and is configured to have a first resonant frequency, to absorb a first spike of the switching unit. The second charging branch is coupled in parallel with the switching unit, and is configured to have a second resonant frequency, to absorb a second spike of the switching unit. The first discharging branch is coupled between an input power source and the first charging branch, to discharge the first charging branch. The second discharging branch is coupled between the input power source and the second charging branch, to discharge the second charging branch.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
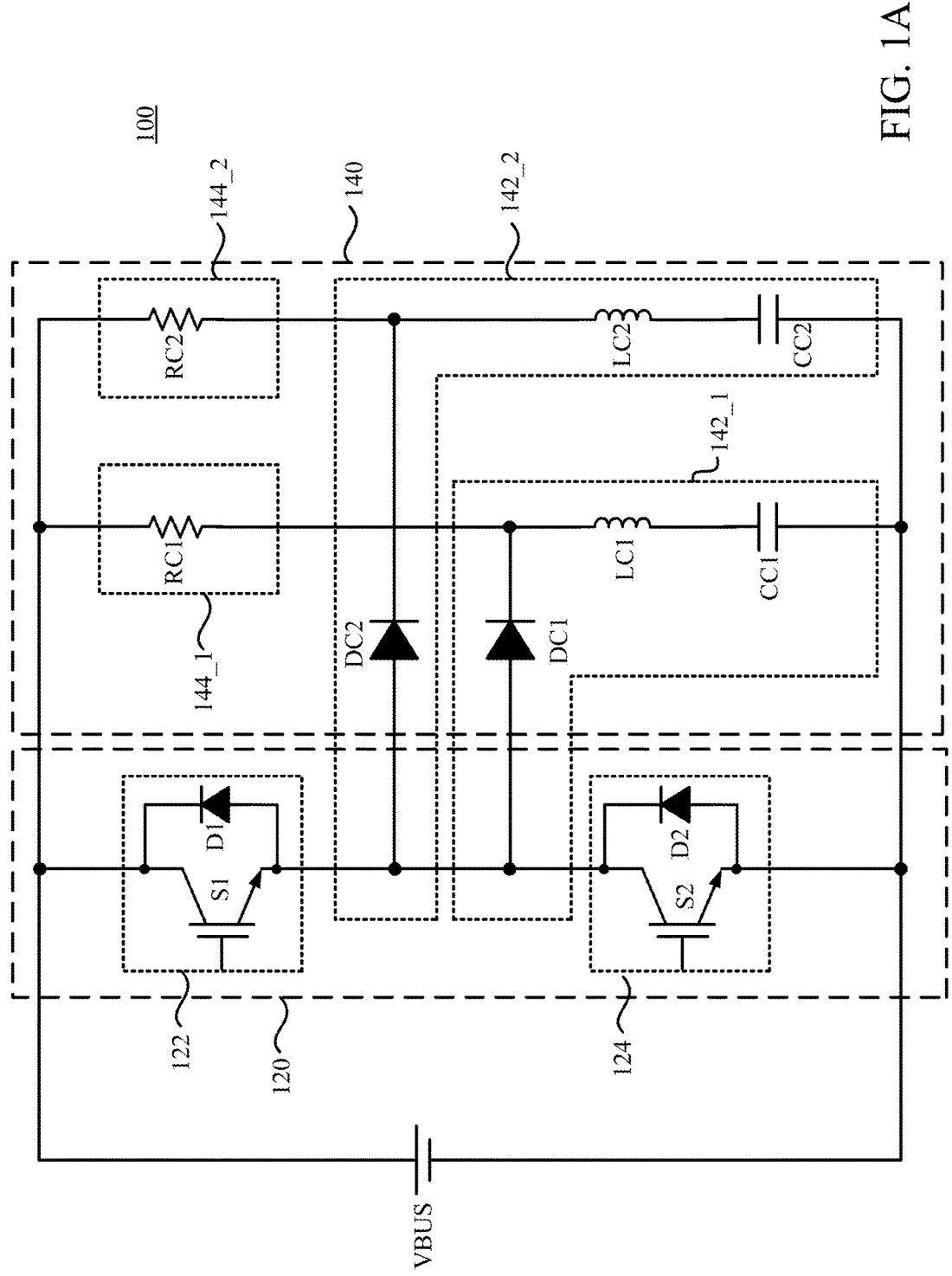
FIG. 1A is a schematic diagram of a converter, in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

In this document, the term "coupled" may also be termed as "electrically coupled", and the term "connected" may be termed as "electrically connected". "Coupled" and "connected" may also be used to indicate that two or more elements cooperate or interact with each other.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Reference is now made to FIG. 1A. FIG. 1A is a schematic diagram of a converter 100, in accordance with some embodiments of the present disclosure. As shown in FIG. 1A, the converter 100 includes a bridge arm 120 and a voltage clamping unit 140. The bridge arm 120 includes a switching unit 122 and a switching unit 124. A first terminal of the switching unit 122 is coupled to an input power source VBUS, a second terminal of the switching unit 122 is coupled to a first terminal of the switching unit 124, and a second terminal of the switching unit 124 is coupled to the input power source VBUS.

In some embodiments, any one of the switching unit 122 and the switching unit 124 includes a power semiconductor switch and a diode that are coupled in parallel with each other. For illustration, as shown in FIG. 1A, the switching unit 122 includes a power semiconductor switch S1 and a diode D1 that are coupled in parallel with each other. Similarly, the switching unit 124 includes a switch S2 and a diode D2 that are coupled in parallel with each other. In various embodiments, the switch S1 and the switch S2 are implemented with various types of transistors, including, for example, insulated gate bipolar transistors (IGBT), metal-oxide-semiconductor field effect transistors (MOSFET), etc.

Figure 1B:
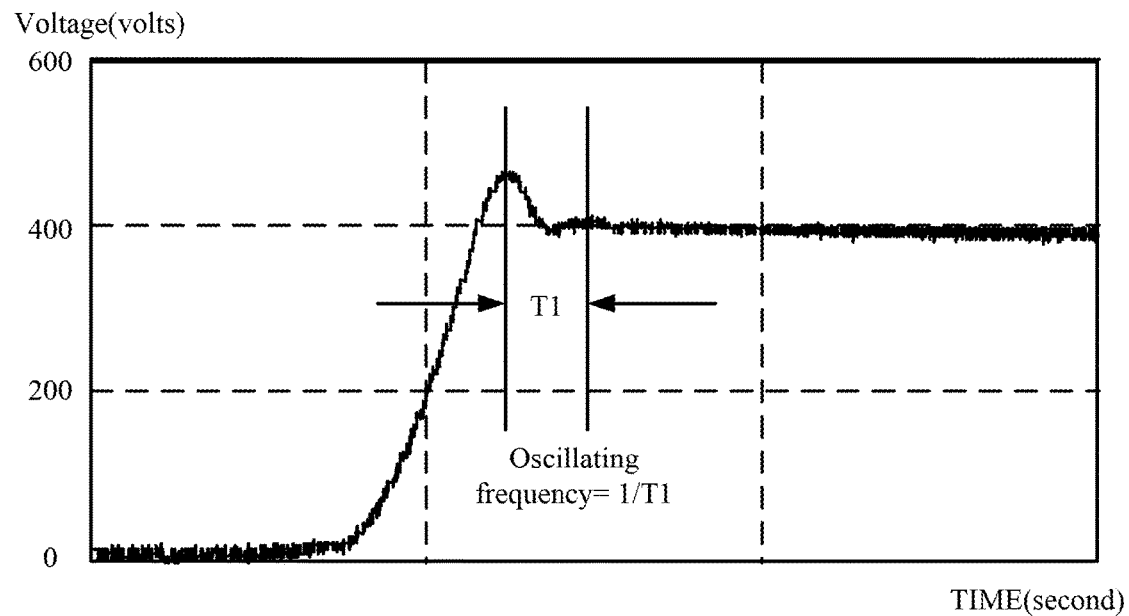
FIG. 1B is a schematic diagram illustrating a spike generated during the switch S2 in FIG. 1A is turned off, in accordance with some embodiments of the present disclosure.
Figure 1C:
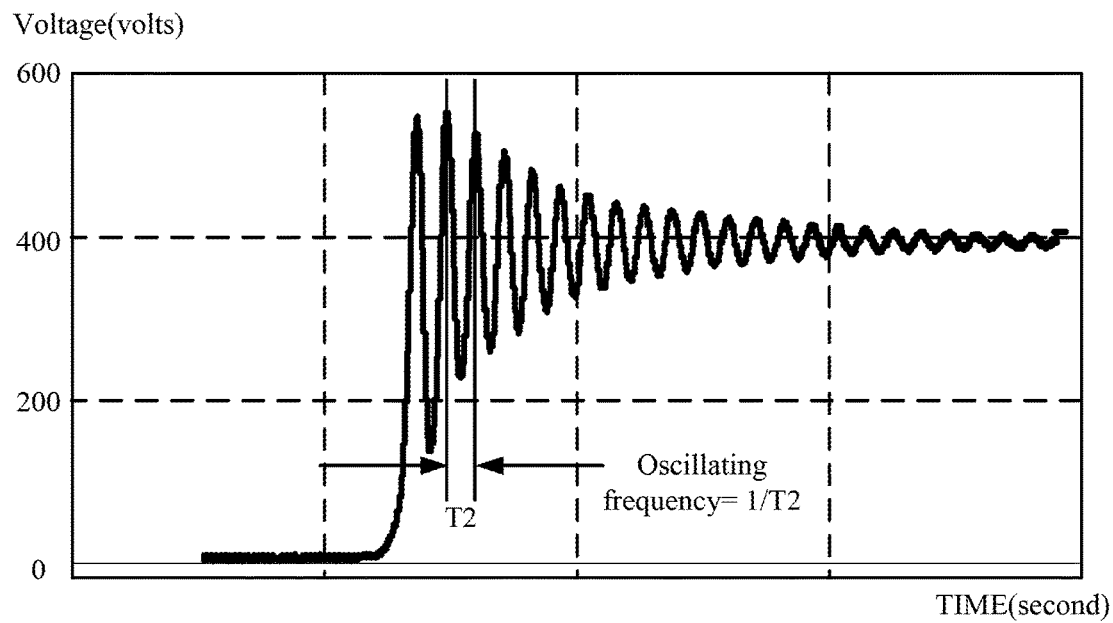
FIG. 1C is a schematic diagram illustrating a spike generated during reverse recovery of the diode D2 in FIG. 1A, in accordance with some embodiments of the present disclosure.

FIG. 1B is a schematic diagram illustrating a spike generated during the switch S2 in FIG. 1A is turned off, in accordance with some embodiments of the present disclosure. FIG. 1C is a schematic diagram illustrating a spike generated during reverse recovery of the diode D2 in FIG. 1A, in accordance with some embodiments of the present disclosure.

As described above, in some embodiments, any one of the switching unit 122 and the switching unit 124 generally includes a power semiconductor switch and a diode that are coupled in parallel with each other. For simplicity, the following embodiments and the related drawings are described with IGBT, but the present disclosure is not limited thereto.

The operating characteristics of the IGBT and that of the diodes are different from each other. For example, when the switching unit 124 is turned off, the voltage peak value and the oscillating frequency 1/T2 of the spike on the diode D2 are different from the voltage peak value and the oscillating frequency 1/T1 of the spike between two terminals of the switch S2. As shown in FIG. 1B and FIG. 1C, compared with the spike of the switch S2, a much higher voltage peak value and higher oscillating frequency are presented in the spike of the diode D2. Therefore, based on the differences of the oscillating frequency and the voltage peak value of these spikes, in different embodiments, the spikes generated by the switch S2 and the diode D2, respectively, are able to be absorbed by the voltage clamping unit 140 having multiple branches. As a result, a better protection can be achieved.

The voltage clamping unit 140 includes a charging branch 142_1 and a charging branch 142_2. The charging branch 142_1 is configured to have a first resonant frequency FS1, to absorb the spike of the switching unit 124. The charging branch 142_2 is configured to have a second resonant frequency FS2, to absorb the spike of the switching unit 124. As a result, when the switching unit 124 is turned off, the spikes having the different frequencies, generated from the switching unit 124, are able to be absorbed by the charging branch 142_1 and the charging branch 142_2. Effectively, the charging branch 142_1 and the charging branch 142_2 are able to provide a voltage clamping protection to improve a reliability of the switching unit 124.

As shown in FIG. 1A, the charging branch 142_1 includes a diode DC1, an inductor LC1, and a capacitor CC1, and the charging branch 142_2 includes a diode DC2, an inductor LC2, and a capacitor CC2. An anode of the diode DC1 and an anode of the diode DC2 are coupled to the first terminal of the switching unit 124. The inductor LC1 is coupled between a cathode of the diode DC1 and the capacitor CC1, and the inductor LC2 is coupled between a cathode of the diode DC2 and the capacitor CC2. The capacitor CC1 and the capacitor CC2 are further coupled to another terminal of the switching unit 124. With such arrangement, when the switching unit 124 is turned off, if the peak values of the spikes are higher than the bus voltage, the capacitor CC1 and the capacitor CC2 will be charged by absorbing the corresponding spikes. As a result, the spike voltage between two terminals of the switching unit 124 can be reduced.

In various embodiments, the first resonant frequency FS1 of the charging branch 142_1 is configured to correspond to the oscillating frequency of the spike generated during the switch S2 is turned off, and the second resonant frequency FS2 of the charging branch 142_2 is configured to correspond to the oscillating frequency of the spike during the diode D2 is in a transition of reverse recovery. In some embodiments, the first resonant frequency FS1 of the charging branch 142_1 is about the same as the oscillating frequency of the spike generated during the switch S2 is turned off, and the second resonant frequency FS2 of the charging branch 142_2 is about the same as the oscillating frequency of the spike during the diode D2 is in the transition of reverse recovery. In yet some embodiments, the first resonant frequency FS1 of the charging branch 142_1 is equal to the oscillating frequency of the spike generated during the switch S2 is turned off, and the second resonant frequency FS2 of the charging branch 142_2 is equal to the oscillating frequency of the spike during the diode D2 is in the transition of reverse recovery.

For example, the first resonant frequency FS1 is able to be set by adjusting the capacitance value of the capacitor CC1 and the inductance value of the inductor LC1, and the second resonant frequency FS2 is able to be set by adjusting the capacitance value of the capacitor CC2 and the inductance value of the inductor LC2. The capacitor CC1 and the capacitor CC2 are satisfied with the following equations:

$$C1 = \frac{1}{(2\pi \times FS1)^2 \times L1}$$

$$C2 = \frac{1}{(2\pi \times FS2)^2 \times L2}$$

Where C1 is the capacitance value of the capacitor CC1, C2 is the capacitance value of the capacitor CC2, L1 is the inductance value of the inductor LC1, and L2 is the inductance value of the inductor LC2.

Since the characteristics of the switch S2 is different from the characteristics of the diode D2, the oscillating frequency of the spike generated during the diode D2 is in the transition of reverse recovery is generally higher than the oscillating frequency of the spike generated during the switch S2 is turned off. In this embodiment, the charging branch 142_1 is configured to absorb the spike, generated during the switch S2 is turned off, of the switching unit 124. The charging branch 142_2 is configured to absorb the spike, generated during the diode D2 is in the transition of reverse recovery, of the switching unit 124. Accordingly, the impacts of the spikes having different frequencies generated from the switching unit 124 are able to be reduced by the voltage clamping unit 140.

In some embodiments, the inductor LC1 and the capacitor CC1 are configured to operate as a series-resonant circuit of the voltage clamping unit 140. When the switch S2 is turned off, a resonance is correspondingly occurred in the inductor LC1 and the capacitor CC1. At the series-resonant point, the impedance of the charging branch 142_1 of the voltage clamping unit 140 is lowest. As a result, the spike generated from the switch S2 can be fully absorbed by the charging branch 142_1. Effectively, the spike, generated during the switch S2 is turned off, is able to be fully limited by the inductor LC1 and the capacitor CC1.

Similarly, when the diode D2 is in the transition of reverse recovery, a resonance is correspondingly occurred in the inductor LC2 and the capacitor CC2. At the series-resonant point, the impedance of the charging branch 142_2 of the voltage clamping unit 140 is lowest. As a result, the spike generated from the diode D2 can be fully absorbed by the charging branch 142_2. Effectively, the spike, generated during the diode D2 is in the transition of reverse recovery, is able to be fully limited by the inductor LC2 and the capacitor CC2.

In some other embodiments, the resonant frequency of the aforementioned series-resonant circuit is set to be close to the oscillating frequency of the corresponding spike. Accordingly, the function of absorbing the corresponding spike can be achieved as well.

In some embodiments, the inductor LC1 and the inductor LC2 are parasitic inductances on the transmission lines. For example, by utilizing a simulation or a network analyzer to test the charging branch 141_1 and the charging branch 141_2, the inductance values of the inductor LC1 and the inductor LC2 are obtained. Accordingly, the capacitance values of the capacitor CC1 and capacitor C2 are then set. Alternatively, in some other embodiments, the inductor LC1 and the inductor LC2 implemented by directly using inductive elements. The arrangements of the inductor LC1 and the inductor LC2 are given for illustrative purposes only, and the present disclosure is not limited thereto. Person skilled in the art is able to adjust the arrangements of the inductor LC1 and the inductor LC2 according to practical applications.

Furthermore, with continued reference to FIG. 1A, the voltage clamping unit 140 further includes a discharging branch 144_1 and a discharging branch 144_2. The discharging branch 144_1 is coupled between the charging branch 142_1 and a positive terminal of the input power source VBUS, and the discharging branch 144_2 is coupled between the charging branch 142_2 and a positive terminal of the input power source VBUS. In some embodiments, the discharging branch 144_1 includes a resistor RC1, and the discharging branch 144_2 includes a resistor RC2. The electrical energy absorbed by the capacitor CC1 is able to be released via the resistor RC1, and the electrical energy absorbed by the capacitor CC2 is able to be released via the resistor RC2. As a result, the operations of the voltage clamping, corresponding to the switch S2 and the diode D2, can be constantly performed, in order to prevent the impacts of the spikes from happening to the switch D2 and the diode D2.

Figure 2:
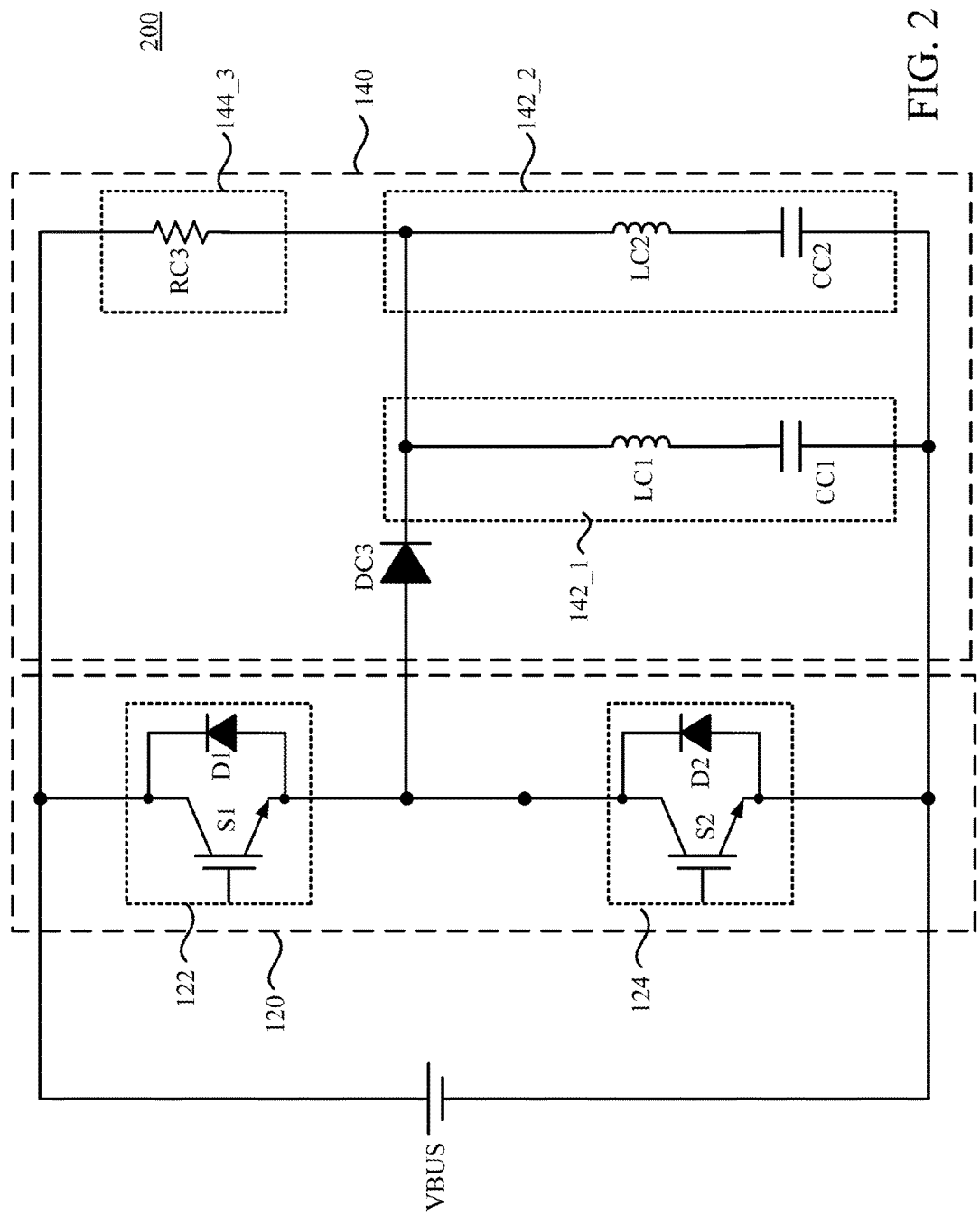
FIG. 2 is a schematic diagram of a converter, in accordance with some embodiments of the present disclosure.

Reference is now made to FIG. 2. FIG. 2 is a schematic diagram of a converter 200, in accordance with some embodiments of the present disclosure. Compared with FIG. 1A, the voltage clamping unit 140 of the converter 200 in FIG. 2 only employs a single diode DC3 and a single resistor RC3. In other words, in this embodiment, additional diodes, i.e., the diode DC1 and the diode DC2 in FIG. 1A, are not utilized in the charging branch 142_1 and the charging branch 142_2. Instead, the charging branch 142_1 and the charging branch 142_2 are coupled to the switching unit 124 via a diode DC3. Effectively speaking, the diode DC1 and the diode DC2 in FIG. 1A, is implemented with a single diode DC3.

In greater details, as shown in FIG. 2, the charging branch 142_1 only includes a capacitor CC1 and an inductor LC1, and the charging branch 142_2 only includes a capacitor CC2 and an inductor LC2. The capacitor CC1 and the capacitor CC2 are coupled to the switching unit 124 via the same diode DC3, to absorb the corresponding spikes.

Similarly, in this embodiment, the voltage clamping unit 140 only includes a single discharging branch 144_3, which can be implemented with the aforementioned resistor RC3. In other words, in this embodiment, the capacitor CC1 and the capacitor CC2 are discharged via the same resistor RC3. Effectively speaking, the discharging branch 144_1 and the discharging branch 144_2 in FIG. 1A are implemented with the single discharging branch 144_3.

The numbers of the diodes and the discharging branches of the voltage clamping unit 140, as illustrated in the previous embodiments, are given for illustrative purposes only, and the present disclosure is not limited thereto. Various numbers of the diodes and the discharging branches or any combination of each embodiment are within the contemplated scope of the present disclosure. For example, in some other embodiments, the voltage clamping unit 140 utilizes two diodes DC1 and DC2, but only utilizes a single discharging branch 144_3, i.e., a single resistor RC3. Alternatively, in some embodiments, the voltage clamping unit 140 utilizes a single diodes DC3, and also utilizes two discharging branches 144_1 and 144_2.

Figure 3:
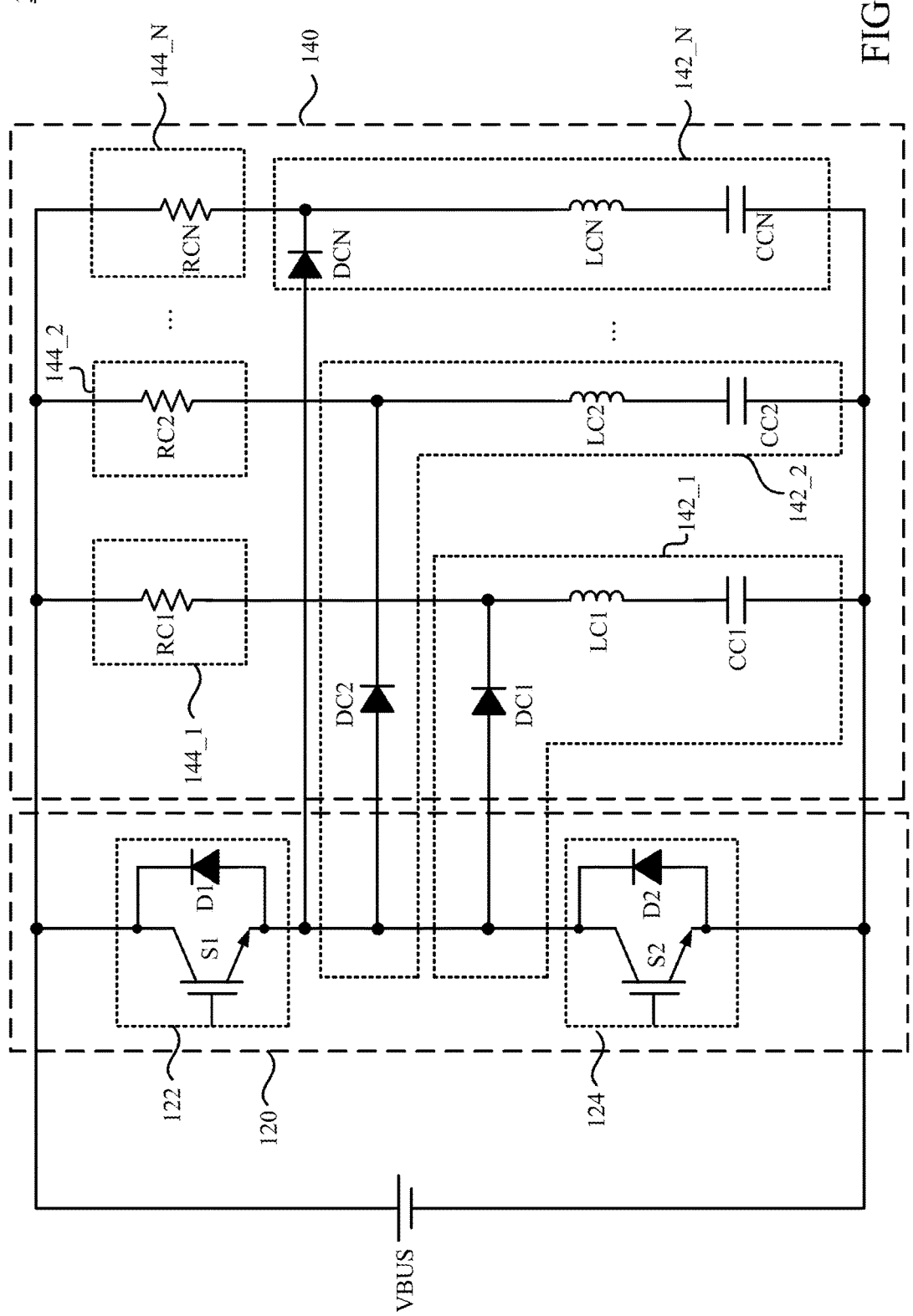
FIG. 3 is a schematic diagram of a converter, in accordance with some embodiments of the present disclosure.

Reference is now made to FIG. 3. FIG. 3 is a schematic diagram of a converter 300, in accordance with some embodiments of the present disclosure. Compared with FIG. 1A, the voltage clamping unit 140 of the converter 300 further includes charging branches 142_1-142_N and discharging branches 144_1-144_N. The arrangements of the charging branches 142_1-142_N and discharging branch 144_1-144_N are similar with the aforementioned charging branches 142_1 and 142_2, and the discharging branches 144_1 and 144_2. Thus, the repetitious descriptions are not given here.

In various embodiments, as described in FIG. 2 above, at least two of the charging branches 142_1-142_N are able to be implemented with the same diode. In some further embodiments, all of the diodes DC1-DCN are able be implemented with the same diode. Similarly, in various embodiments, as described in FIG. 2 above, at least two of the discharging branches 144_1-144_N are implemented with the same discharging branch. In some further embodiments, all of the discharging branches 144_1-144_N are implemented with the same discharging branch.

In this embodiment, the respective frequencies of the charging branches 142_1-142_N are configured to be different from each other. For example, the charging branches 142_1 have a first resonant frequency, the charging branches 142_2 have a second resonant frequency, and the charging branches 142_N have an N-th resonant frequency, in which the first resonant frequency, the second resonant frequency, and the N-th resonant frequency are different from each other, and N is a positive integer greater than 2. As a result, the charging branches 142_1-142_N are able to absorb the spikes, having different oscillating frequencies, generated during the switching unit 124 is turned off. In other words, in some embodiments, considering the impacts caused from parasitic inductances and parasitic capacitances in the circuit or other variations, the spikes, having various oscillating frequencies, possibly generated by the switching unit 124 are able to be absorbed by using the charging branches 142_1-142_N, which have different resonant frequencies. Accordingly, the reliability of the switching unit 124 is able to be further improved.

Figure 4:
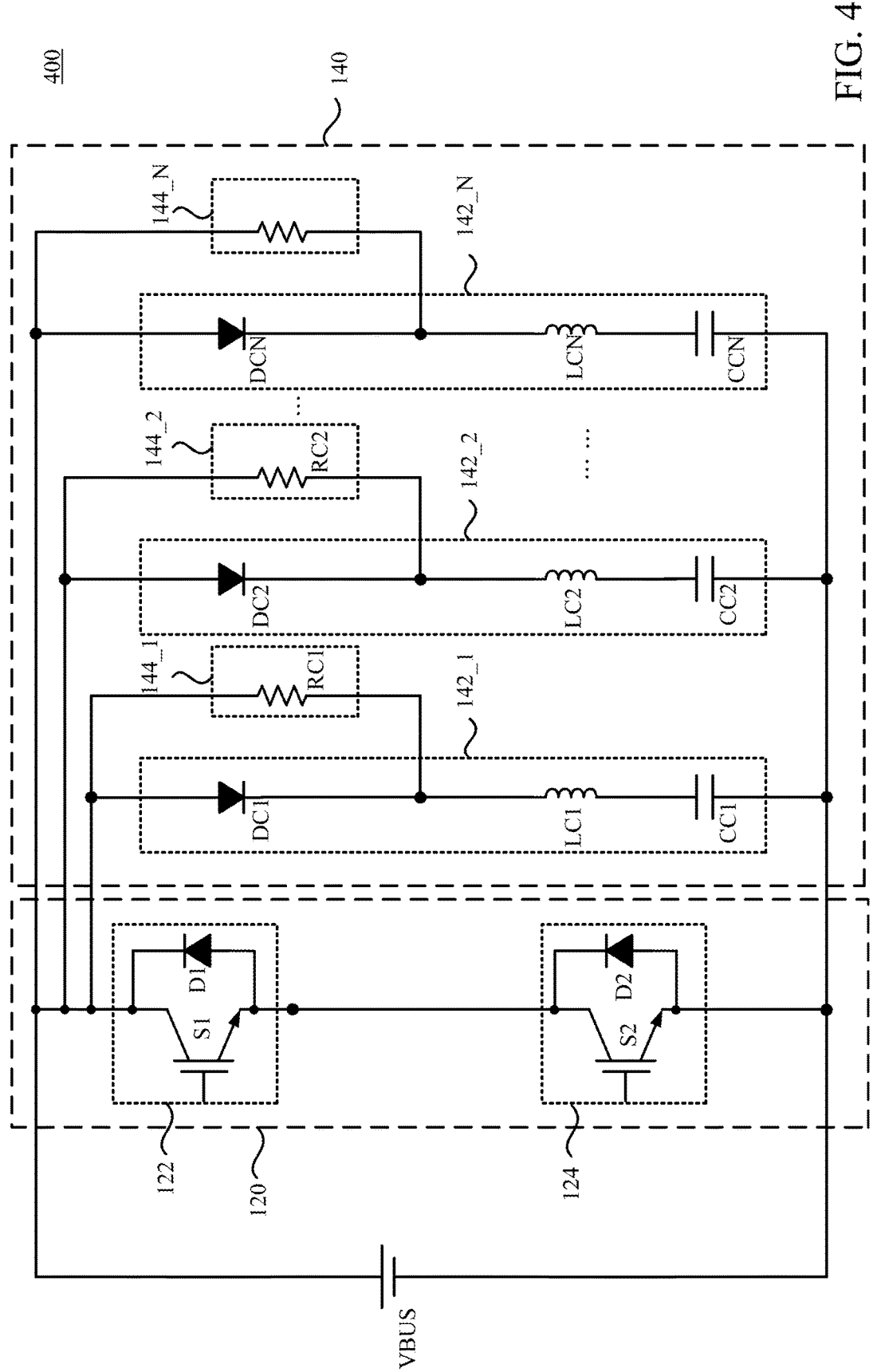
FIG. 4 is a schematic diagram of a converter, in accordance with some embodiments of the present disclosure.

Reference is now made to FIG. 4. FIG. 4 is a schematic diagram of a converter 400, in accordance with some embodiments of the present disclosure. Compared with FIG. 3, as shown in FIG. 4, the charging branches 142_1-142_N of the converter 400 are coupled in parallel with the bridge arm 120. In greater detail, the diode DC1 and the diode DC2 are coupled to a first terminal of the switching unit 122, and the first terminal of the switching unit 122 is coupled to a positive terminal of the input power source VBUS. The capacitor CC1 and the capacitor CC2 are coupled to a second terminal of the switching unit 124, and the second terminal of the switching unit 124 is coupled to an negative terminal of the input power source VBUS.

Compared with the embodiments above, in this embodiment, the spiked, generated during the switching unit 124 is turned off, are transmitted to the charging branches 142_1-142_N via the switching unit 122, in order to charge the capacitors CC1-CCN in the charging branches 142_1-142_N. Effectively, the corresponding spikes are absorbed by the charging branches 142_1-142_N. Accordingly, the spikes are thus limited. Moreover, in this embodiments, the charging branches 142_1-142_N are able to simultaneously absorb at least one spike, having a corresponding oscillating frequency, generated during the switching unit 122 is turned off. For example, the charging branch 142_1 and the charging branch 142_2 are configured to absorb the spikes from the switching unit 124, and the switching unit 142_N−1 (not shown) and the switching unit 142_N are configured to absorb the spikes from the switch S1 and the diode D1 of the switching unit 122. In other words, the charging branches 142_1-142_N are able to absorb the spikes, having different frequencies, generated from the bridge arm 120. The arrangements described above are given for illustrative purposes only, and other types of the arrangements are also within the contemplated scope of the present disclosure.

As shown in FIG. 4, the voltage clamping unit 140 further includes discharging branches 144_1-144-N. The discharging branches 144_1-144-N correspond to the charging branches 142_1-142_N, respectively. The capacitors CC1-CCN of the charging branches 142_1-142_N are able to be discharged via the corresponding one of the discharging branches 144_1-144-N. As described above, in some embodiments, at least two of the diodes DC1-DCN of the charging branches 142_1-142-N are able to be implemented with the same diode. In further embodiments, all of the diodes DC1-DCN are able to be implemented with the same diode. As described above, in some embodiments, at least two of the discharging branches 144_1-144_N are able to be implemented with the same discharging branch. In further embodiments, all of the discharging branches 144_1-144_N are able to be implemented with the same discharging branch.

Figure 5:
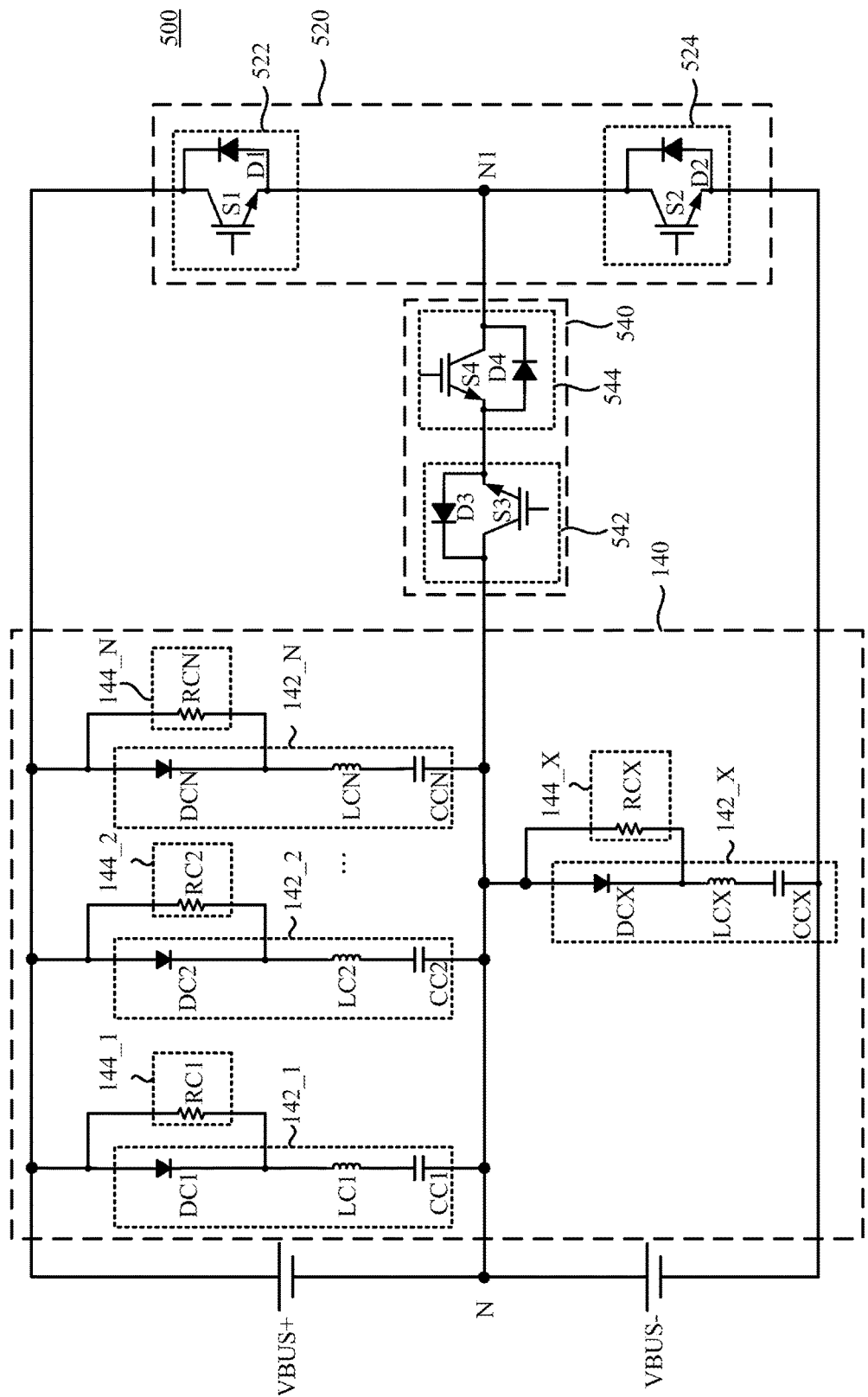
FIG. 5 is a schematic diagram of a converter, in accordance with some embodiments of the present disclosure.

Reference is now made to FIG. 5. FIG. 5 is a schematic diagram of a converter 500, in accordance with some embodiments of the present disclosure. As shown in FIG. 5, the converter 500 includes a bridge arm 520, a bridge arm 540, and the voltage clamping unit 140. In this embodiment, the converter 500 is a T-type neutral point clamped (TNPC) circuit. An input power source VBUS+ and an input power source VBUS− are coupled to a neural point N. The bridge arm 520 includes a switching unit 522 and a switching unit 524. A first terminal of the switching unit 522 is coupled to the voltage clamping unit 140, a second terminal of the switching unit 522 is coupled to a first terminal (which is referred to as a connection point N1) of the switching unit 524, and a second terminal of the switching unit 524 is coupled to an negative terminal of the input power source VBUS−. The bridge arm 540 is coupled between the neural point N and the connection point N1. The bridge arm 540 includes a switching unit 542 and a switching unit 544. The switching unit 542 and the switching unit 544 are coupled in series. In greater detail, the emitting terminal of the switch S4 of the switching unit 542 is connected to the emitting terminal of the switch S3 of the switching unit 542. The arrangements of the switching units 522, 524, 542, and 544 are similar with the switching units 122 and 122 described in the previous embodiments, and thus the repetitious descriptions are not given here.

The voltage clamping unit 140 includes charging branches 142_1-142_N and 142_X, and discharging branches 144_1-144_N and 144_X. The charging branches 142_1-142_N are coupled between the neural point N and the positive terminal of the input power source VBUS+. The charging branch 142_1-142_N are able to absorb the spikes generated from the switching units 522, 542, and 544, and are able to be discharged via the discharging branches 144_1-144_N. The charging branch 142_X is disposed between the neutral point N and the negative terminal of the input power source VBUS, to absorb the spikes generated from the switching units 524, 522,542, and 544. Similarly, the charging branch 142_X is able to be discharged via the discharging branch 144_X. As a result, the voltage clamping operations for each switching units 522, 524, 542, and 544 of the converter 500 can be performed.

The numbers of the charging branches and the numbers of the discharging branches described are given for illustrative purposes only, and the present disclosure is not limited thereto. For example, in some other embodiments, much more charging branches 142_X can be employed, to absorb spikes having the different oscillating frequencies.

Figure 6:
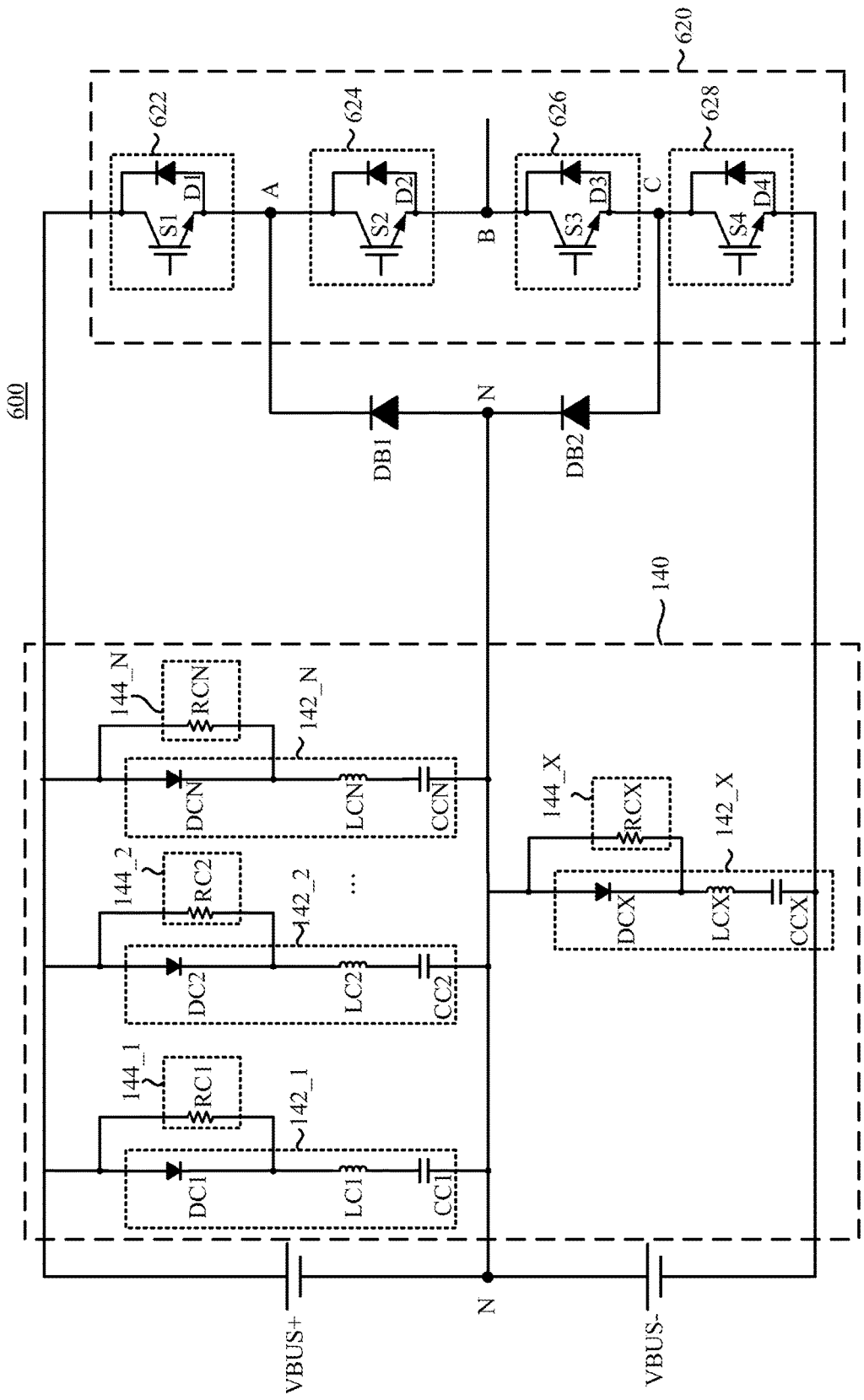
FIG. 6 is a schematic diagram of a converter, in accordance with some embodiments of the present disclosure.

Reference is now made to FIG. 6. FIG. 6 is a schematic diagram of a converter 600, in accordance with some embodiments of the present disclosure. As shown in FIG. 6, the converter 600 includes a bridge arm 620, a diode DB1, a diode DB2, and the voltage clamping unit 140. In this embodiment, the converter 600 is a diode neutral-point-clamped (DNPC) circuit.

The input power source VBUS+ and the input power source VBUS− are coupled to the neutral point N. The bridge 620 includes a switching unit 622, a switching unit 624, a switching unit 626, and a switching unit 628. A first terminal of the switching unit 622 is coupled to the positive terminal of the input power source VBUS+, and a second terminal of the switching unit 622 is coupled to a first terminal (which is referred to as a connection point A hereinafter) of the switching unit 624 and a cathode of the diode DB1. A second terminal of the switching unit 624 is coupled to a first terminal (which is referred to as a connection point B hereinafter) of the switching unit 626. A second terminal of the switching unit 626 is coupled to a first terminal (which is referred to as a connection point C hereinafter) of the switching unit 628 and an anode of the diode DB2. A second terminal of the switching unit 628 is coupled to the negative terminal of the input power source VBUS−. A cathode of the diode DB2 and an anode of diode DB1 are coupled to together and then coupled to the neutral point N, the anode of the diode DB1 is coupled to the connection point A, and the cathode of the diode DB2 is coupled to the connection point C. The arrangements of the switching units 622, 624, 626, and 628 are similar with the switching units 122 and 124 in the previous embodiments, and thus the repetitious descriptions are not given here.

The voltage clamping unit 140 includes the charging branches 142_1-142_N and 142_X and the discharging branches 144_1-144_N and 144_X. The charging branches 142_1-142_N are coupled between the cathode of the diode DB2, i.e., the neutral point N, and the first terminal of the switching unit 622. As a result, the charging branches 142_1-142_N are able to absorb the spikes generated from the switching unit 622 and the diode DB1, and the charging branches 142_1-142_N are discharged via the discharging branches 144_1-144_N. The charging branch 142_X is disposed between the cathode of the diode DB2, i.e., the neutral point N, and the second terminal of the switching unit 628, to absorb spikes generated from the switching unit 628 and the diode DB2. Similarly, the charging branch 142_X is able to be discharged via the discharging branch 144_X. Accordingly, the voltage clamping operations for the switching units 622 and 628, and the diodes DB1-DB2 of the converter can be performed.

The numbers of the charging branches and the numbers of the discharging branches described above are given for illustrative purposes only, and the present disclosure is not limited thereto. For example, in some other embodiments, much more charging branches 142_X can be employed, to absorb spikes having the different oscillating frequencies.

The applications of the voltage clamping unit 140 are given for illustrative purposes only, and the present disclosure is not limited thereto. Various types of the converter, which are able to employ the voltage clamping unit 140, are also within the contemplated scope of the present disclosure.

As described above, the converter and the voltage clamping unit thereof provided in the present disclosure are able to absorb the spikes, having different oscillating frequencies, generated from switching units. Effectively, the spikes, generated during the switching units are turned off, can be limited, to achieve a complete voltage clamping protection.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A converter, comprising:
   a first bridge arm comprising a first switching unit; and
   a voltage clamping unit coupled to the first bridge arm, the voltage clamping unit comprising:
      a first charging branch configured to have a first resonant frequency to absorb a first spike of the first switching unit during the first switching unit is turned off; and
      a second charging branch configured to have a second resonant frequency to absorb a second spike of the first switching unit during the first switching unit is turned off,
      wherein the second resonant frequency is different from the first resonant frequency.

2. The converter of claim 1, wherein the first charging branch comprises a first capacitor, the first capacitor is coupled in parallel with the first switching unit to absorb the first spike, and the second charging branch comprises a second capacitor, the second capacitor is coupled in parallel with the first switching unit to absorb the second spike.

3. The converter of claim 2, wherein the first charging branch further comprises a first inductor, and the second charging branch further comprises a second inductor, wherein the first inductor is coupled to the first capacitor in series, the second inductor is coupled to the second capacitor in series, and the first capacitor and the second capacitor are satisfied with following equations:

$$C1 = \frac{1}{(2\pi \times FS1)^2 \times L1}$$

$$C2 = \frac{1}{(2\pi \times FS2)^2 \times L2}$$

wherein C1 is a capacitance value of the first capacitor, C2 is a capacitance value of the second capacitor, FS1 is the first resonant frequency, FS2 is the second resonant frequency, L1 is an inductance value of the first inductor, and L2 an inductance value of the second inductor, wherein the first resonant frequency corresponds to an oscillating frequency of the first spike, and the second resonant frequency corresponds to an oscillating frequency of the second spike.

4. The converter of claim 3, wherein the first charging branch further comprises a first diode, a cathode of the first diode is coupled to the first capacitor, an anode of the first diode is coupled to the first switching unit, to absorb the first spike;
   wherein the second charging branch further comprises a second diode, a cathode of the second diode is coupled to the second capacitor, and an anode of the second diode is coupled to the first switching unit, to absorb the second spike.

5. The converter of claim 4, wherein the first diode and the second diode are implemented with the same diode.

6. The converter of claim 4, wherein the voltage clamping unit further comprises:
   a first discharging branch coupled between the first capacitor and a positive terminal of an input power source, wherein the first capacitor is discharged via the first discharging branch; and
   a second discharging branch coupled between the second capacitor and the positive terminal of the input power source, wherein the second capacitor is discharged via the second discharging branch.

7. The converter of claim 6, wherein the first discharging branch and the second discharging branch are implemented with the same discharging branch.

8. The converter of claim 6, wherein the voltage clamping unit further comprises:
   a third charging branch having a third resonant frequency, to absorb a third spike corresponding to the first switching unit, wherein an oscillating frequency of the third spike corresponds to the third resonant frequency, and the first resonant frequency, the second resonant frequency, and the third resonant frequency are different from each other.

9. The converter of claim 8, wherein the voltage clamping unit further comprises:
   a third discharging branch coupled between the third charging branch and the positive terminal of the input power source, wherein the third charging branch is discharged via the third discharging branch.

10. The converter of claim 9, wherein at least two of the first discharging branch, the second discharging branch, and the third discharging branch are implemented with the same discharging branch.

11. The converter of claim 1, wherein the first bridge arm further includes a second switching unit, the second switching unit is coupled to the first switching unit in series, and the voltage clamping unit is coupled in parallel with the first bridge and is further configured to absorb at least one spike of the second switching unit.

12. A voltage clamping unit, comprising:
   a first charging branch coupled in parallel with a switching unit, and configured to have a first resonant frequency, to absorb a first spike of the switching unit during the switching unit is turned off;
   a second charging branch coupled in parallel with the switching unit, and configured to have a second resonant frequency, to absorb a second spike of the switching unit during the switching unit is turned off, wherein the second resonant frequency is different from the first resonant frequency;

a first discharging branch coupled between an input power source and the first charging branch, to discharge the first charging branch; and a second discharging branch coupled between the input power source and the second charging branch, to discharge the second charging branch.

13. The voltage clamping unit of claim 12, wherein the first charging branch comprises a first capacitor, the first capacitor is coupled in parallel with the switching unit to absorb the first spike, and the second charging branch comprises a second capacitor, the second capacitor is coupled in parallel with the switching unit to absorb the second spike.

14. The voltage clamping unit of claim 13, wherein the first charging branch further comprises a first inductor, and the second charging branch further comprises a second inductor, wherein the first inductor is coupled to the first capacitor in series, the second inductor is coupled to the second capacitor in series, and the first capacitor and the second capacitor are satisfied with following equations:

$$C1 = \frac{1}{(2\pi \times FS1)^2 \times L1}$$

$$C2 = \frac{1}{(2\pi \times FS2)^2 \times L2}$$

wherein C1 is a capacitance value of the first capacitor, C2 is a capacitance value of the second capacitor, FS1 is the first resonant frequency, FS2 is the second resonant frequency, L1 is an inductance value of the first inductor, and L2 an inductance value of the second inductor, wherein the first resonant frequency corresponds to an oscillating frequency of the first spike, and the second resonant frequency corresponds to an oscillating frequency of the second spike.

15. The voltage clamping unit of claim 14, wherein the first charging branch further comprises a first diode, and the second charging branch further comprises a second diode, wherein an anode of the first diode is coupled to the switching unit, a cathode of the first diode is coupled to the first capacitor, an anode of the second diode is coupled to the switching unit, and a cathode of the second diode is coupled to the second capacitor.

16. The voltage clamping unit of claim 15, wherein the first diode and the second diode are implemented with the same diode.

17. The voltage clamping unit of claim 12, wherein the first discharging branch and the second discharging branch are implemented with the same discharging branch.

18. The voltage clamping unit of claim 15, further comprising:

a third charging branch coupled in parallel with the switching unit, and configured to have a third resonant frequency, to absorb a third spike of the switching unit, wherein an oscillating frequency of the third spike corresponds to the third resonant frequency, and the first resonant frequency, the second resonant frequency, and the third resonant frequency are different from each other; and a third discharging branch coupled between the third charging branch and the input power source, to discharge the third charging branch.

19. The voltage clamping unit of claim 18, wherein at least two of the first discharging branch, the second discharging branch, and the third discharging branch are implemented with the same discharging branch.

20. The voltage clamping unit of claim 12, wherein the first spike is generated from a diode of the switching unit, and the second spike is generated from a switch of the switching unit.

* * * * *